(12) United States Patent
Duplys

(10) Patent No.: US 12,273,434 B2
(45) Date of Patent: Apr. 8, 2025

(54) SENSOR FOR GENERATING TAGGED SENSOR DATA

(71) Applicant: Robert Bosch GmbH, Stuttgart (DE)

(72) Inventor: Paulius Duplys, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 479 days.

(21) Appl. No.: 17/653,176

(22) Filed: Mar. 2, 2022

(65) Prior Publication Data
US 2022/0297705 A1  Sep. 22, 2022

(30) Foreign Application Priority Data
Mar. 17, 2021 (EP) .................................. 21 16 3053

(51) Int. Cl.
*H04L 9/00* (2022.01)
*G06N 20/00* (2019.01)
*B60W 50/00* (2006.01)

(52) U.S. Cl.
CPC .............. *H04L 9/00* (2013.01); *G06N 20/00* (2019.01); *B60W 2050/0005* (2013.01); *B60W 2050/0043* (2013.01); *H04L 2209/16* (2013.01); *H04L 2209/84* (2013.01)

(58) Field of Classification Search
CPC ... H04L 9/00; H04L 2209/16; H04L 2209/84; G06N 20/00; B60W 2050/0005; B60W 2050/0043; G06V 20/56; G01S 13/88; G01S 17/88; H04Q 9/00; H04Q 2209/40; H04Q 2209/70; H04Q 2209/80; H04W 4/44; H04W 28/06
See application file for complete search history.

(56) References Cited

U.S. PATENT DOCUMENTS

| | | | |
|---|---|---|---|
| 2018/0267558 A1* | 9/2018 | Tiwari | H04N 23/90 |
| 2019/0138748 A1* | 5/2019 | Long | H04N 7/183 |
| 2020/0034476 A1* | 1/2020 | Grant | G06N 20/00 |

FOREIGN PATENT DOCUMENTS

| | | |
|---|---|---|
| EP | 3761594 A1 | 1/2021 |
| GB | 2574891 A | 12/2019 |
| WO | 2020058334 A1 | 3/2020 |

* cited by examiner

*Primary Examiner* — Wesley J Tucker
*Assistant Examiner* — Han Hoang
(74) *Attorney, Agent, or Firm* — NORTON ROSE FULBRIGHT US LLP; Gerard A. Messina

(57) ABSTRACT

A method, apparatus and system for generating sensor data comprising a subset of tagged sensor data. The method includes: sensing, using a sensing element, ambient data, wherein the ambient data characterises a condition of an environment proximate to the sensing element; identifying, using a data identification engine, at least a first subset of the ambient data comprising a representation of, or identifying information related to, personally relevant information obtained by the sensing element; tagging, using a data tagging engine, the first subset of the ambient data with at least one data tag; and outputting, via the communication interface, at least a second subset of the ambient data comprising ambient data that has not been tagged by the data tagging engine.

15 Claims, 5 Drawing Sheets

SENSOR FOR GENERATING TAGGED SENSOR DATA

CROSS REFERENCE

The present application claims the benefit under 35 U.S.C. § 119 of European Patent Application No. EP 21 16 3053.8 filed on Mar. 17, 2021, which is expressly incorporated herein by reference in its entirety.

FIELD

The present invention relates to a sensor for generating sensor data comprising a subset of tagged sensor data, and an associated method, system, and computer readable medium.

BACKGROUND INFORMATION

Sensors are devices that measure physical properties and transmit data or signals characterising the physical properties to other systems for processing. In the example of an autonomous or semiautonomous vehicle, the vehicle may comprise many different types of sensor, for example forward, backwards, and side facing video cameras capable of obtaining visual ambient data of the environment surrounding the vehicle, LIDARs, RADARs, heat-sensitive cameras, microphones as some examples. The processing of data from such sensors can be further improved.

SUMMARY

According to a first aspect of the present invention, there is provided a sensor for generating sensor data comprising a subset of tagged sensor data. In accordance with an example embodiment of the present invention, the sensor comprises a sensing element, a data identification engine, a data tagging engine, and a communication interface. The sensing element is configured to obtain ambient data. The ambient data characterises a condition of an environment proximate to the sensing element. The data identification engine is configured to obtain the ambient data from the sensing element, and the data identification engine is configured to identify at least a first subset of the ambient data comprising a representation of, or identifying information related to, personally relevant information obtained by the sensing element. The data tagging engine is configured to tag the first subset of the ambient data with at least one data tag. The communication interface is configured to output at least a second subset of the ambient data comprising ambient data that has not been tagged by the data tagging engine.

An effect of the sensor according to the first aspect of the present invention is the reduction of the amount of bandwidth required to transmit data from the sensor. For example, data from a video sensor that would ultimately be stripped from a video data feed at a central server can now be removed in the sensor. This may reduce the bandwidth requirement for transmitting data from the sensor, leading to energy savings and improved network performance. A further effect of the sensor is that the latency and communication stages between capturing the data that will eventually be tagged, and the tagging actually occurring is reduced to a minimum. This provides security benefit that untagged sensor data does not propagate outside the sensor when it may relate to personally relevant information. Accordingly, this provides a security benefit.

According to a second aspect of the present invention, there is provided a system comprising at least one sensor according to the first aspect a first data processing node and a data communications network. The sensor is configured to transmit at least the second subset of ambient data comprising ambient data obtained by the sensor to the first processing node via the data communications network, wherein the second subset of ambient data does not comprise a representation of, or identifying information related to personally relevant information in the environment obtained by the sensing element.

According to a third aspect of the present invention, there is provided a method for generating sensor data comprising a subset of tagged sensor data. In accordance with an example embodiment of the present invention, the method comprises:

sensing, using a sensing element, ambient data, wherein the ambient data characterises a condition of an environment proximate to the sensing element;

identifying, using a data identification engine, at least a first subset of the ambient data comprising a representation of, or identifying information related to, personally relevant information obtained by the sensing element;

tagging, using a data tagging engine, the first subset of the ambient data with at least one data tag; and outputting, via the communication interface, at least a second subset of the ambient data comprising ambient data that has not been tagged by the data tagging engine.

According to a fourth aspect of the present invention, there is provided a computer readable medium or signal comprising machine-readable instructions which, when executed by a processor, is capable of carrying out the method according to the second aspect.

Sensors are devices that measure physical properties detected in an ambient environment proximate to the sensor, and transmit data or signals characterising the physical properties of the ambient environment to other systems for processing. Typically, the sensed data is transmitted over a communications network. The quality of service that communications networks can support is related to the amount of data that needs to be transmitted over the network. Accordingly, if the amount of sensor data that needs to be transmitted over the network can be reduced prior to transmission, an improved quality of service (such as improved latency, reduced bandwidth occupancy, better datalink accessibility for other network occupants) is provided. If the sensed data can be categorised at the sensor into data that should be transmitted, and data that should not be transmitted according to the policy, there may be a quality of service benefit. In an alternative view, it may be beneficial to transmit all sensor data over a network, but to tag portions of the sensor data for compliance or non-compliance with a generic policy. This can enable a communications network to remove tagged portions of the sensor data away from the sensor, but before the sensor data reaches its ultimate destination, thus still leading quality of service benefits.

Many policies may be applied to perform such data identification, filtering and/or tagging directly at the sensor. One example of a policy is related to the collection, storage, and processing of personally identifying information (PII), or personally relevant information obtained by the sensing element of the sensor.

Personally Identifying Information (PII) may, for example, be governed by regulatory standards. In the European Union, PII is governed by the General Data Protection Regulation (GDPR). GDPR also applies outside of the European Economic Area (EEA) if companies engaged in collecting storing, or processing PII data are "offering goods or services" to data subjects within the EEA, or are monitoring the behaviour of data subjects within the EEA. GDPR requires every PII data processing entity to obtain explicit consent from every data subject whose PII data is collected, stored, or processed. In cases where the data subject has not given their consent but the processing entity has a legitimate interest to access and process the PII data, this data must be processed in the least intrusive manner.

One problem is associated with data centres used in the autonomous vehicle domain, in which sensor data from autonomous vehicles is transmitted into a backend and processed for various purposes. Such image information may comprise street scenery images such as faces, license plates, and other information related to individual persons. The present invention proposes to sense PII data and tag it, thus significantly reducing the effort of the processing entity when collecting, storing, and processing sensor data.

Exemplary embodiments of the present invention are depicted in the figures, which are not to be construed as limiting the present invention, and are explained in greater detail below.

DETAILED DESCRIPTION OF EXAMPLE EMBODIMENTS

Figure 1:
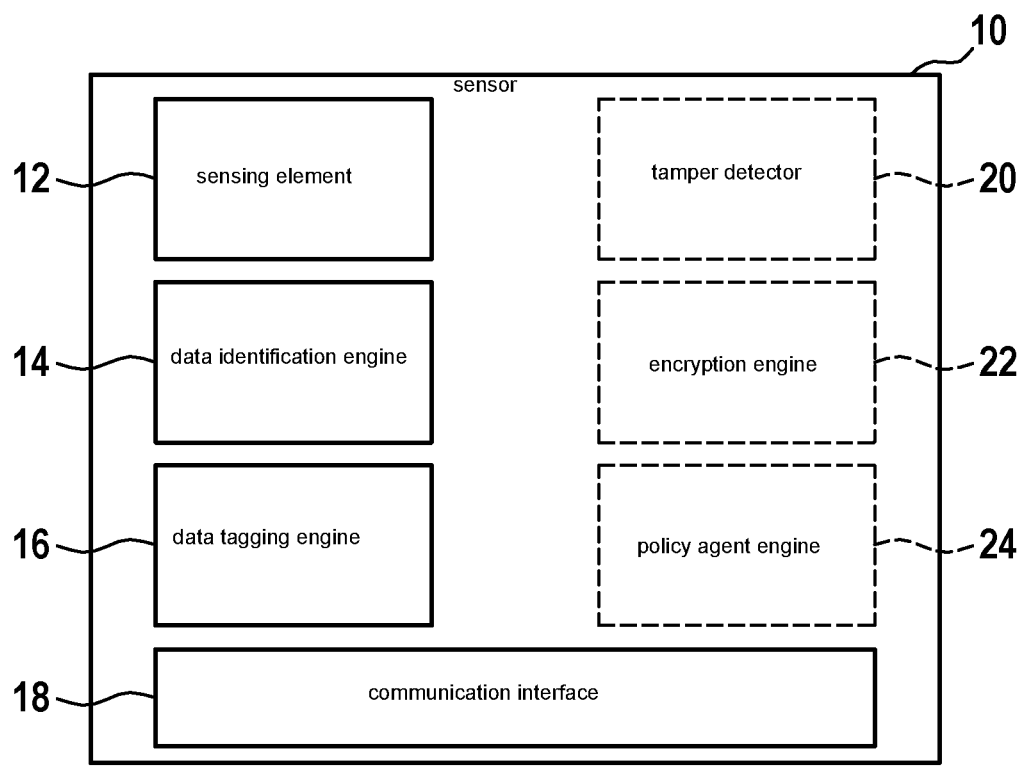
FIG. 1 schematically illustrates a sensor according to the first aspect of the present invention.

A problem in any application where data is processed that potentially contains personally identifiable information PII is to distinguish between data that can be processed in a regular way, and data that must be either discarded, or processed in a special manner that is compliant with local regulations such as GDPR. For example, sensor data related to PII may be processed in a different computing centre or a physically separated or logically separated server. Accordingly, the present application proposes to tag personally identifiable information so that it may be processed in a different manner.

In examples, sensor data may be identified as PII data, and then tagged using one or more PII tags within the sensor itself. Subsequently, the PII tags may be used to perform a tailored data processing operation if the sensor data that is tagged comprises PII. Using a conventional sensor, all data collected must be treated as PII data. Therefore, in an example automotive vehicle test run, all sensor data acquired from sensors online autonomous vehicle would have to be handled according to local data privacy regulations. The ability to differentiate between sensor data containing PII and sensor data without PII therefore offers multiple improvements including: reduction of the cost for data collection, storage, and processing, freedom to share data not comprising PII with third parties, the freedom to use data not comprising PII for purposes that were not envisioned in the original application, the ability to discard or collect data based on its PII attributes, and an ability to implement fine-ground policies for collecting, storing, and processing data based on its PII attributes.

According to a first aspect, there is provided a sensor 10 for generating sensor data comprising a subset of tagged sensor data, wherein the sensor comprises a sensing element 12, a data identification engine 14, a data tagging engine 16, and a communication interface 18. The sensing element 12 is configured to obtain ambient data, wherein the ambient data characterises a condition of an environment proximate to the sensing element. The data identification engine 14 is configured to obtain the ambient data from the sensing element 12, and the data identification engine 14 is configured to identify at least a first subset of the ambient data comprising a representation of, or identifying information related to, personally relevant information obtained by the sensing element 12. The data tagging engine 16 is configured to tag the first subset of the ambient data with at least one data tag. The communication interface 18 is configured to output at least a second subset of the ambient data comprising ambient data that has not been tagged by the data tagging engine 18.

As an example, the sensing element 12 senses data such as physical quantities, images, video, RADAR, LIDAR, or extracts physical quantities indirectly from log files, for example. This data is passed to the data identification engine 14 to enable the identification of data that may constitute PII. If data from the sensing element 12 does contain some PII, the data tagging engine 16 applies to a first subset of the ambient data a tag denoting that the data comprises PII. In an example, more than one type of tag may be applied to a plurality of different subsets of the ambient data denoting different categories of PII.

Therefore, the sensor 10 performs data identification and data tagging. The sensor 10 may also perform limited data processing operations according to a data processing policy. Alternatively, the sensor 10 may transmit the tagged data via a communications interface 18 to an external data processor where the data processing operation is performed. However, in both cases the data comprising PII is distinguished from the data that does not contain PII by data tags applied by the data tagging unit. Optionally, different data-processing policies are applied to tagged data in the first subset of the ambient data and untagged data in the second subset of the ambient data.

Optionally, the sensor 10 may comprise a tamper detector 20. As will subsequently be explained, the tamper detector 20 may detect intrusion into a sealed casing of the sensor 10. Optionally, the sensor 10 may comprise an obfuscation (encryption) module 22. Optionally, the sensor 10 may comprise a policy agent engine 24.

The communication interface 18 may support, for example, a wired connection for data transfer or visual data transfer such as Ethernet, CANBUS, USB, DVI, Display Port, HDMI, or SDI. A skilled person will appreciate that many different wired data transfer modalities may be supported by the communication interface 18. Furthermore, the communication interface 18 may support, for example, a wireless connection for data transfer or visual data transfer such as WiFi, Bluetooth, ZigBee, 3GPP LTE, as examples. However, any PII-containing data communicated by the communication interface 18 will have been processed by the data tagging engine 16. In this way, any data that leaves the sensor 10 is tagged with PII tags from a predefined set.

According to an embodiment, prior to the ambient data being tagged by the data tagging engine, the ambient data is logically unreadable by any other processing element of the sensor apart from the data identification engine and the data tagging engine, and/or the sensor is configured to prevent output of the first subset of the ambient data.

In an embodiment, the data identification engine 14 and the data tagging engine 16 are comprised in the same unit or casing, and/or on the same printed circuit board, as the sensor 10. In an embodiment, the data identification engine 14 and the data tagging engine 16 are comprised on the same microcontroller, microprocessor, System on Chip, or FPGA used to obtain the ambient data from the sensing element 10.

Figure 2:
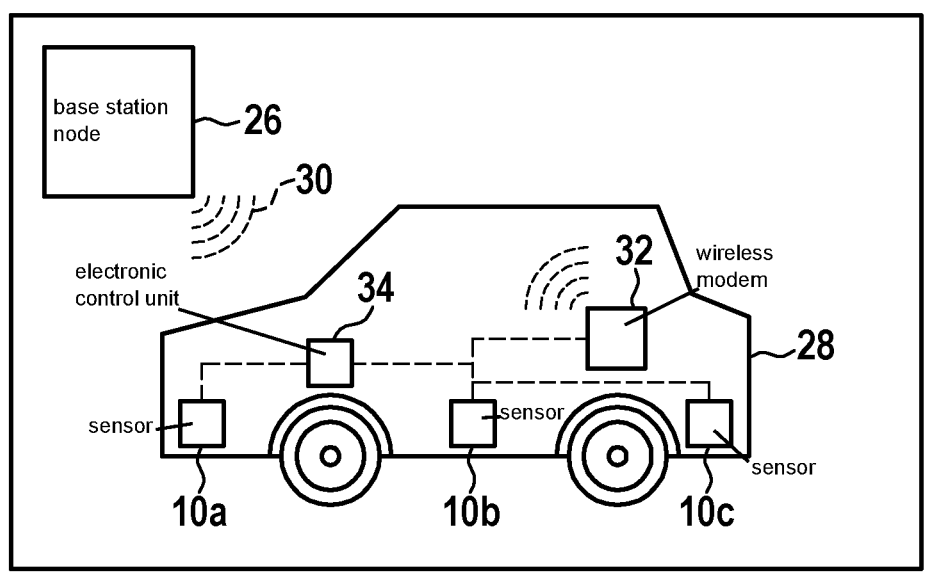
FIG. 2 schematically illustrates a vehicle comprising a plurality of sensors according to the first aspect of the present invention.

FIG. 2 schematically illustrates a semi-autonomous vehicle 28 comprising a plurality of sensors according to the first aspect. For example, first 10a, second 10b and third 10c sensors (in this example, image sensors) according to the first aspect may be connected via their communications interfaces to a vehicle communication network. An electronic control unit (ECU) 34 has access to data from the first 10a, second 10b and third 10c sensors. Furthermore, the semi-autonomous vehicle 28 may comprise a wireless modem 32 configured to transmit 30 the first and second subsets of ambient data to a base station node 26 for onward transmission. In an embodiment, the electronic control unit 34 is configured to transmit the second subsets of ambient data to the base station node 26, but to remove data in the first subset of ambient data (using the tags applied by the sensors 10a, 10b, and 10c). In this way, a reduction in the amount of data transmitted to the base station node 26 is achieved, because data that would not pass a privacy policy is pre-marked by the first 10a, second 10b and third 10c sensors, and thus does not need to be transmitted beyond the semi-autonomous vehicle 28.

An effect of the sensor according to this aspect is that information describing or characterising a person or information connected to them sensed by the sensing element from the ambient environment of the sensor cannot be accessed by any data processing means (i.e., data processor) prior to the data identification engine making an assessment about whether or not to tag such information. In the embodiment, all data generated by the sensing element is processed by the data identification element before being provided to other microprocessors and the like inside the sensing element. In an embodiment, the functionality that the ambient data is logically unreadable by any other processing element may be switched on and off on the basis of time that the data has been captured, a geographical location of the sensor is used in, as two examples.

Figure 3A:
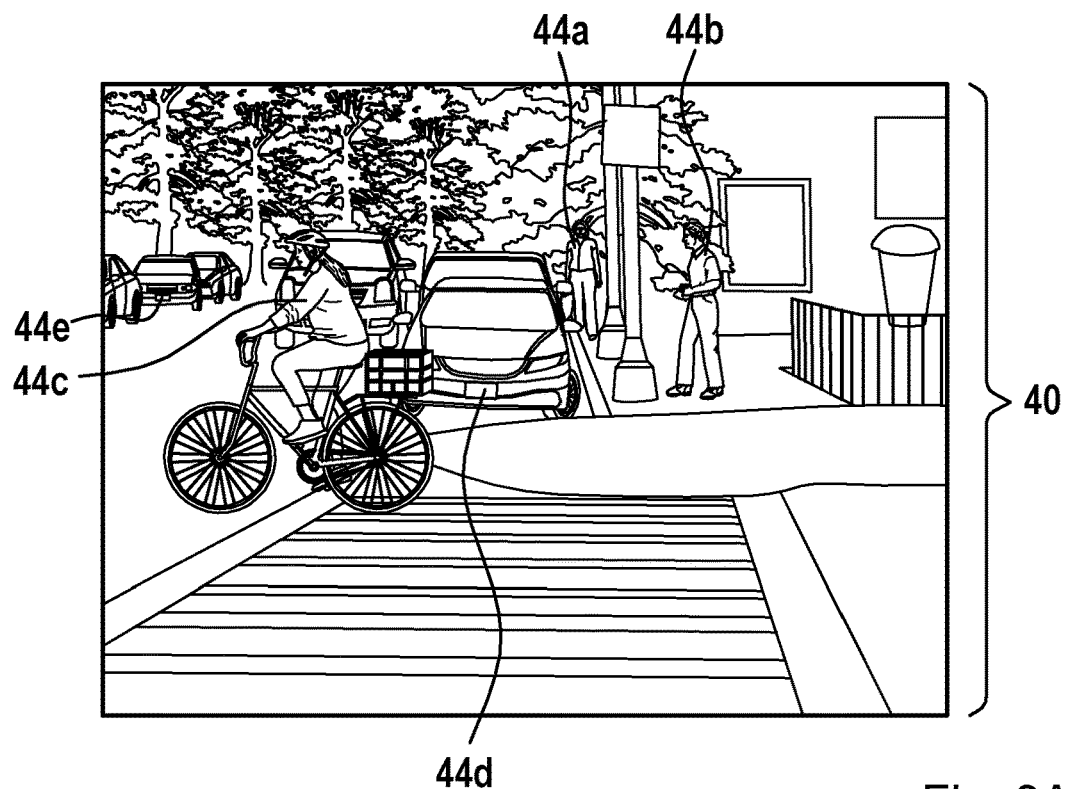
FIG. 3A schematically illustrates an example of image data containing data having a personal origin.

FIG. 3A schematically illustrates an example of image data containing data having a personal origin in the context of autonomous driving. The image field 40 may, for example, be representative of the view from a sideward-facing sensor 10 such as a video camera of a semi-autonomous vehicle. The field of view comprises subregions illustrating first 44a, second 44b and third 44c pedestrians. The image areas comprising pedestrians are a representation personally relevant information. Furthermore, the field of view comprises subregions containing indirectly personal relevant information, in this case vehicle number plates 44c and 44d. The subregions illustrating first 44a, second 44b and third 44c pedestrians and the subregions illustrating vehicle number plates 44c and 44d are an example of PII that should be tagged in (or removed from) this image data (or associated video). The subregions illustrating first 44a, second 44b and third 44c pedestrians may be detected using gait analysis, face detection, pose estimation and many other types of analyses, optionally implemented using machine learning. The subregions illustrating vehicle number plates 44c and 44d may be identified using geometric analysis, optical character recognition, character segmentation, colour analysis, and other methods.

Figure 3B:
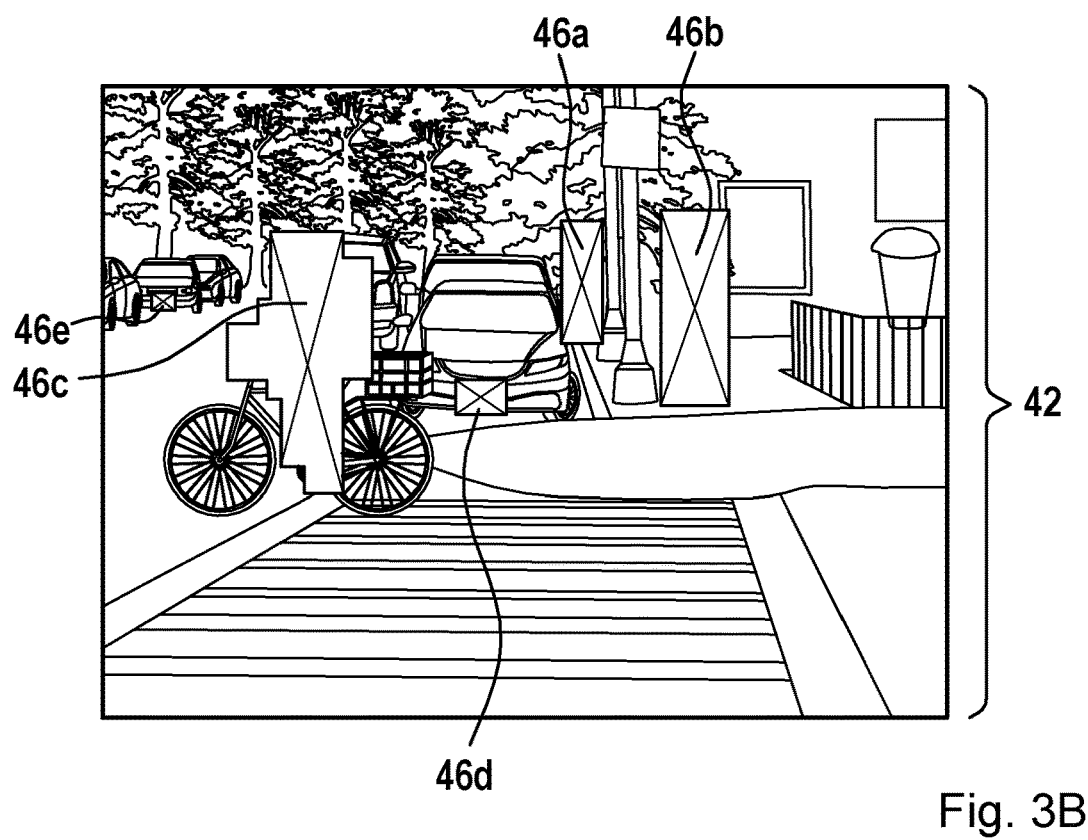
FIG. 3B schematically illustrates an example of the image data of FIG. 3A, wherein the data having a personal origin has been tagged and/or obfuscated.

FIG. 3B schematically illustrates an example of the image data of FIG. 3A following transmission from the sideward-facing sensor 10, wherein the data having a personal origin has been tagged and/or obfuscated. Regions corresponding to the subregions illustrating first 44a, second 44b and third 44c pedestrians and the subregions illustrating vehicle number plates 44c and 44d in FIG. 3A are renumbered to 46a-d in FIG. 3B. These regions are illustrated as having been tagged and the original PII relevant data obfuscated. Of course, obfuscation of the PII relevant data is optional and the PII relevant data may, in an embodiment, be forwarded from the sensor 10 with the first subset of data having been tagged as PII relevant, but without obfuscation.

According to an embodiment, the sensor further comprises an obfuscation module. The obfuscation module is configured to obfuscate the first subset of the ambient data. The communication interface is configured to transmit the obfuscated first subset of the ambient data.

For example, ambient data comprised in the first subset (PII containing data) may be encrypted using a encryption protocol previously agreed and initiated with a secure remote data centre. In this way, ambient data comprised in the first subset is only readable by the secure remote data centre. In another example, the ambient data comprised in the first subset (PII containing data) may be obfuscated. For example, as regards image data, obfuscation is the removal of degrees of resolution so that an inference can be made about the type of object in the image data, but personally identifiable information cannot be obtained. A typical example of obfuscation is to transmit car number plate image data with a low resolution so that the personally identifiable numbers of the number plate are not transmitted, but the colouring of the number plate is transmitted so that a viewer is able to identify the general presence of a number plate, but not the person to which the number plate belongs.

An effect of this embodiment is that any party attempting to access the first subset of the ambient data without the means to undo the obfuscation operation applied inside the sensor will not succeed in obtaining the data in the obfuscated first subset of the ambient data.

According to an embodiment the data identification engine is configured to identify at least the first subset and the second subset of the ambient data; and/or wherein the data tagging engine is configured to tag at least the first subset of the ambient data according to a data tagging policy. An effect of this embodiment is that the sensor may be flexibly provisioned with policies as to which ambient data to tag as personal data, and which ambient data to output. For example, if the sensor is a video camera used in a autonomous vehicle, regulatory policies may change as a vehicle is driven across national borders. The data tagging policy may be changed based on the location of the vehicle.

As a first example scenario, video data may be captured by an autonomous vehicle or an active driver assistance module. This requires at least imaging or camera sensors. The potential PII are pictures containing people, car license plates, and house numbers. The PII is identified by the data identification engine by the detection of human-like shapes, license plates, numbers or letters, for example using deep neural networks or classic image recognition algorithms.

The PII tag applied may be a single bit, single bit in combination with an object classifier, or a single bit in combination with several bits enabling a "sticky" processing policy.

As a second example scenario, RADAR data may be collected using radar sensors. In this case, the potential PII is the radar signature of a person, which may be identified using the detection of human-like shapes in the RADAR data. The PII tag applied may be a single bit, single bit in combination with an object classifier, or a single bit in combination with several bits enabling a "sticky" processing policy. This example also applies to LIDAR data.

As a third example scenario, microphones in a smart phone or wearable may detect human speech. The PII made may be identified using the specific frequencies or harmonics of human speech. The PII tag applied may be a single bit, single bit in combination with an object classifier, or a single bit in combination with several bits enabling a "sticky" processing policy.

As a fourth example scenario, movement information may be detected using accelerometers in smart phones or wearables. The potential PII are movements or gait analyses specific to a single person for example the detection of a person walking or running based on the accelerometer data. The PII tag applied may be a single bit, single bit in combination with an object classifier, or a single bit in combination with several bits enabling a "sticky" processing policy.

FIGS. 4A to 4D schematically illustrate embodiments according to the first aspect.

Figure 4A:
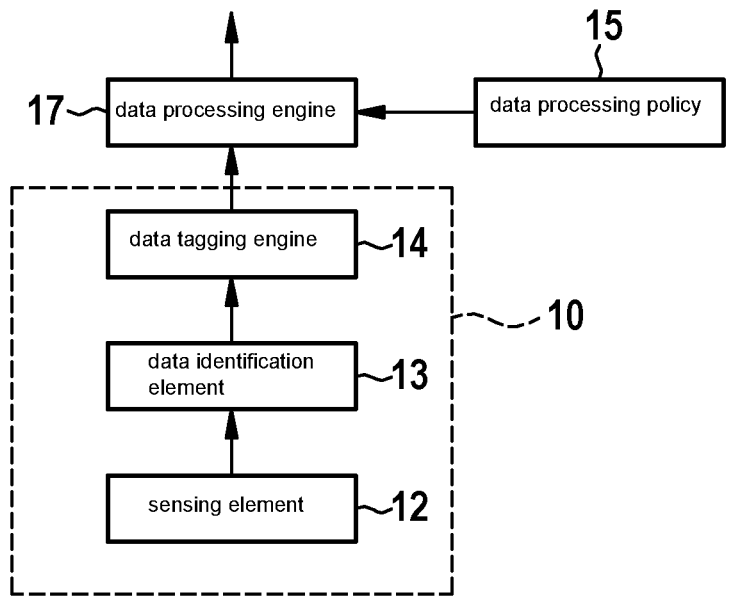
FIGS. 4A to 4D schematically illustrate example embodiments according to the first aspect of the present invention.

FIG. 4A schematically illustrates an embodiment of a sensor 10 comprising a sensing element 12, data identification engine 13, and data tagging engine 14. In this case, data processing performed by a data processing engine 17 external to the sensor 10 is performed on the first and second subsets of the ambient data. In other words, PII tagged ambient data, or data with no identified PII, is transmitted outside of the sensor 10. Ambient data containing PII is not transmitted outside of the sensor 12 without being tagged as containing PII. The data processing engine 17 performs data processing according to a data processing policy 15 on PII tagged ambient data, or data with no identified PII. The dashed line around the sensor 10 may represent an impenetrable barrier such as a tamper-proof plastic moulding or an epoxy encapsulated electronics assembly.

Figure 4B:
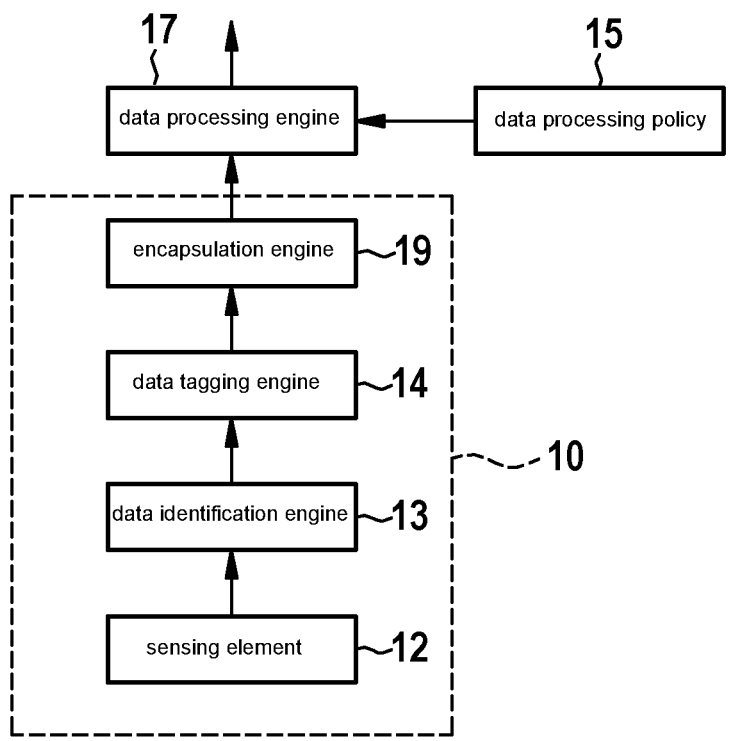

FIG. 4B schematically illustrates an embodiment of a sensor 10. The sensor comprises an encapsulation engine 19 configured to encrypt or encapsulate data from the data tagging engine. In an embodiment, the encapsulation engine 19 encapsulates or encrypts data containing PII tagged by the data tagging engine 14, and does not encapsulate or encrypt data containing PII that is not tagged by the encapsulation engine 19. In an embodiment, the encapsulation engine 19 encapsulates or encrypts all data tagged by the data tagging engine 14. In an embodiment, the encapsulation engine 19 encapsulates or encrypts data containing PII with a first encryption scheme that is stronger than a second encryption scheme. For example, the first encryption scheme may rely on a longer key sequence than the second encryption scheme. In the case of the embodiment of FIG. 4B, the data processing engine 17 and the data processing policy 15 are located outside the sensor 10. They are configured to de-encapsulate or decrypt data from the encapsulation engine 19.

Figure 4C:
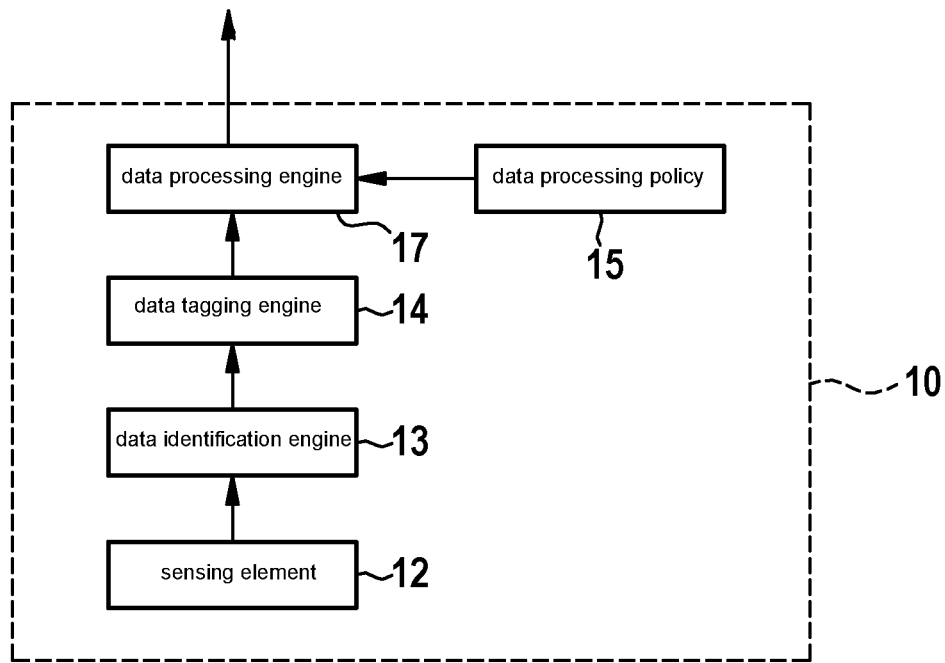

FIG. 4C schematically illustrates an embodiment of a sensor 10 where ambient data from the sensing element 12 is identified by the data identification engine 13. Untagged sensor data is tagged by the data tagging engine 13, and processed by a data processing engine 17 within the sensor 10 (deemed to be secure). For example, an image recognition operation could be applied by the data processing engine 17. Processed data is subsequently transmitted to the data tagging engine 16. The data tagging engine 16 obtains a data transmission policy and only transmits the data to the backend (such as an external data centre, cloud, or server) if the data transmission policy permits this. Because the data processing engine is located within the sensor 10, the amount of raw data to be transmitted from the sensor is reduced, because PII relevant data is stripped from the data stream as soon as possible.

Figure 4D:
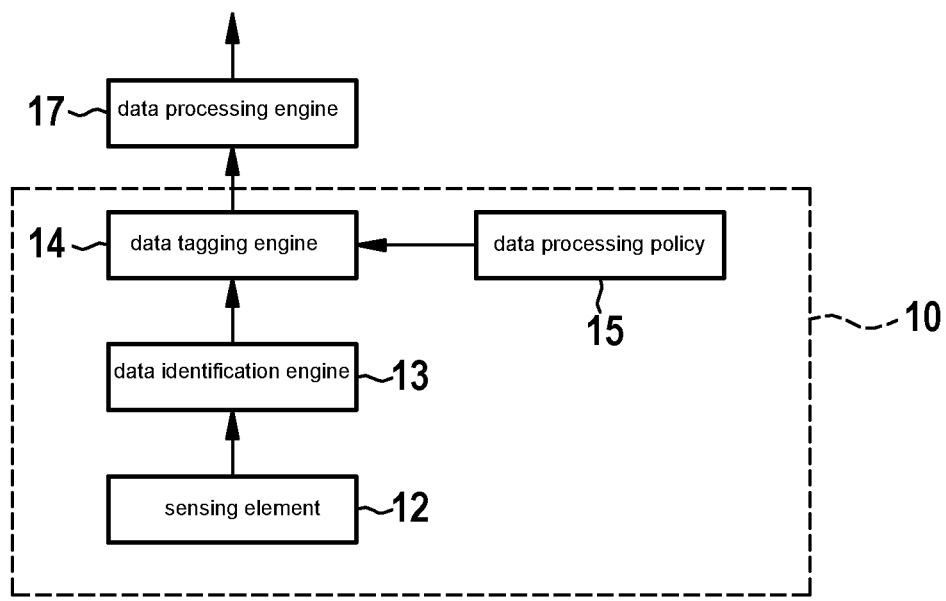

FIG. 4D schematically illustrates an embodiment where the data processing policy 15 is stored within the sensor 10 and is used as an input to the data tagging engine 14. In this embodiment, the data processing policy 15 may, for example, have a rule to omit all items of sensor data comprising PII, only allowing non-PII data to be transmitted from the sensor 10. The sensor is configured to communicate with an external data processing engine 17. In an embodiment, the data processing policy 15 can be updated via a side channel (not illustrated) to the hardware, firmware or software hosting the data processing policy 15. In an embodiment, the data processing policy 15 is unchangeable.

According to an embodiment, the data identification engine is configured to obtain at least one record comprising a signature of at least one item of specimen ambient data resembling a particular representation of, or particular identifying information related to, personally relevant information, the signature being applicable by the data identification engine to identify the representation of, or the identifying information of personally relevant information in the environment obtained by the sensing element. An effect of this embodiment is that the sensor may obtain records specifically identifying types of personal information to enable the accurate identification of personal data without requirement for subsequent postprocessing of an entire set of data containing mixed amounts of personal and non-personal data. The sensor may be flexibly updated with different records comprising signatures of different specimen ambient data as requirements and policies change, for example.

According to an embodiment, the data tagging policy is configured to apply at least one tag to at least one subset of the ambient data according to a data processing policy, wherein the data tagging policy defines, for at least one record comprising a signature of at least one item of ambient data, whether to apply the at least one tag to the at least one item of ambient data. In an example, applying a tag to at least one subset of the ambient data comprises appending a flag in a meta data portion of the ambient data referring to the region of the ambient data comprises PII. In another example, applying a tag to at least one subset of the ambient data may comprise generating a bit mask of an image, and setting pixels comprising PII using the bit mask. This in another example, applying a tag to at least one subset of the ambient data may comprise generating a run length code defining where PII is present in an image, and appending the run length code, (or other type of code) to a meta data field of the data album from sensor 10.

According to an embodiment, the sensor further comprises a tamper detector. The tamper detector is communicably coupled to the data tagging engine, and the tamper detector is configured to detect an attempt at physical or electronic intrusion to at least one of the sensing element, the data identification engine, or the data tagging engine. Upon detection of an intrusion, the data tagging engine is further configured to apply at least a further data tag to the at least the first and second subsets of the ambient data denoting an attempted intrusion, or to obfuscate the data comprised in at least the first and second subsets of the ambient data. An effect of this is that a sensor may protect against physical side channel attacks involving damaging the integrity of the sensor housing (such as by fitting extra wires to output connectors, or by reorienting the sensor).

According to an embodiment the sensing element 12 comprises one or more of a video camera, a RADAR sensor, a LIDAR sensor, a microphone, or a physical movement sensor. However, this specification is not limited to these sensor types and the sensing element 12 may comprise other sensing modalities such as an accelerometer, a thermometer, or even log files encoding user-machine interaction modalities such as key tapping sequences.

According to an embodiment, wherein the data identification engine is configured to obtain a signature of one or more of an image or video containing a person, car license plates, or house numbers. An effect is that the filtering of a broad range of signature data relevant to the type of sensing element employed is possible.

According to an embodiment, the data identification engine is configured to obtain a signature comprising a specimen RADAR signature of a person. According to an embodiment, the data identification engine is configured to obtain a signature comprising a specimen LIDAR signature of a person. It is not necessary that the signature identifies or is from a specific person, because the signature serves as a comparative example of the type of data pattern that may indicate that PII is present. In both cases, the signature may be encoded in a point-cloud format, or as a 2D heat map. If the input data is a video, the point-cloud or 2D heat map may, furthermore, capture gait information that can be identified using a Kalman filter or machine learning approach, as one example.

According to an embodiment, the data identification engine is configured to obtain a signature comprising a specimen speech signature of a person. According to an embodiment, the data identification engine is configured to obtain a signature comprising a specimen movement signature of a person. As an example, a specimen speech signature may contain a range of harmonics indicating that human speech is present in an audio signal.

According to an embodiment, the sensor further comprises a policy agent engine. The policy agent engine is configured to store a preset data tagging policy, and to configure the data tagging engine with the preset data tagging policy. The policy agent engine is configured to receive, via the communication interface, an updated data tagging policy from at least one external server. The policy agent engine configures the data tagging engine with the updated
data tagging policy. As an example, the preset data tagging policy may define a range of car number plate types that should be tagged as PII.

According to an embodiment the data identification engine and/or the data tagging engine comprise at least one trained model configured to apply one or more of the data identification policy and/or the data tagging policy, wherein the model has been trained using a machine learning technique. For example, a machine learning model may enable the data identification function and the data tagging function to be performed by the same computational unit. Alternatively, independent machine learning models may be applied to the data identification task and the data tagging task.

Figure 6:
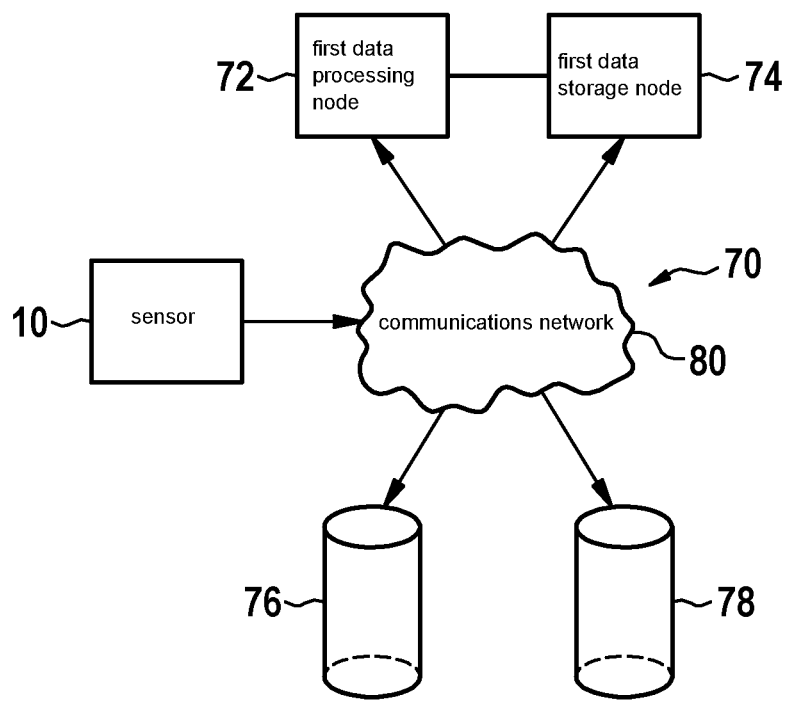

FIG. 6 schematically illustrates a system according to the second aspect.

According to the second embodiment, there is provided a system comprising at least one sensor according to the first aspect or its embodiments, a first data processing node and a data communications network. The sensor is configured to transmit at least the second subset of ambient data comprising ambient data obtained by the sensor to the first processing node via the data communications network, wherein the second subset of ambient data does not comprise a representation of, or identifying information related to personally relevant information in the environment obtained by the sensing element.

Accordingly, the sensor 10 may, in some examples output exclusively non-PII data to be transmitted over the communications network 80 the first data processing node 72 and/or the first data storage node 76. In other examples, the sensor 10 may output a mixture of non-PII data and PII data. However, the PII data is tagged as such, so that routing fabric in the data communications network 80 routes any PII data to a first data processing node 72 and/or a first data storage node 74. In an example, the first data processing node 72 and/or a first data storage node 74 are required to operate according to specific regulatory policies for the protection of PII.

According to an embodiment, the system further comprises a second data processing node. The sensor is configured to transmit at least the first subset of the ambient data to the second processing node via the data communications network. The second data processing node is configured to receive the first subset of the data transmitted from the sensor comprising a first subset of the ambient data with at least one data tag.

According to an embodiment, the system of the second embodiment further comprises a first data storage node and a second data storage node. The first data storage node is configured to receive and to store the first subset of the data transmitted from the sensor. The second data storage node is configured to receive and to store the second subset of the data transmitted from the sensor.

Figure 5:
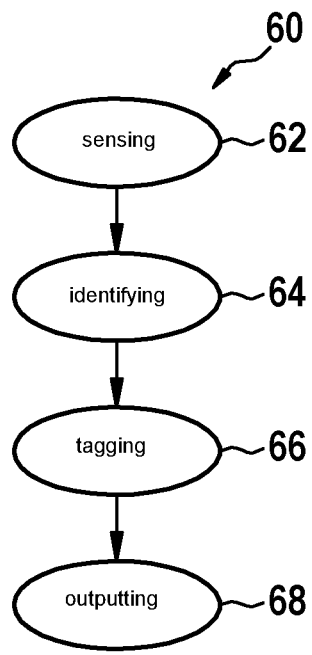
FIG. 5 schematically illustrates a method according to the third aspect of the present invention.

FIG. 5 schematically illustrates a method according to the third aspect.

According to a third aspect, there is provided a method 60 for generating sensor data comprising a subset of tagged sensor data, comprising:

sensing 62, using a sensing element, ambient data, wherein the ambient data characterises a condition of an environment proximate to the sensing element;

identifying 64, using a data identification engine, at least a first subset of the ambient data comprising a representation of, or identifying information related to, personally relevant information obtained by the sensing element;

tagging 66, using a data tagging engine, the first subset of the ambient data with at least one data tag; and outputting 68, via the communication interface, at least a second subset of the ambient data comprising ambient data that has not been tagged by the data tagging engine.

According to a fourth aspect, there is provided a computer readable medium or signal comprising machine-readable instructions which, when executed by a processor, is capable of carrying out the method according to the third aspect.

The examples provided in the figures and described in the foregoing written description are intended for providing an understanding of the features of the present invention. No limitation to the scope of the present invention is intended thereby. The present specification describes alterations and modifications to the illustrated examples. Only the preferred examples have been presented, and all changes, modifications and further applications to these within the scope of the specification are desired to be protected.

What is claimed is:

1. A sensor for generating sensor data comprising including a subset of tagged sensor data, the sensor comprising:
a sensing element;
a data identification engine;
a data tagging engine;
a policy agent engine; and
a communication interface;
wherein the sensing element is configured to obtain ambient data, the ambient data characterizing a condition of an environment proximate to the sensing element;
wherein the data identification engine is configured to obtain the ambient data from the sensing element, and the data identification engine is configured to identify at least a first subset of the ambient data including a representation of, or identifying information related to, personally relevant information obtained by the sensing element;
wherein the policy agent engine is configured to receive, via the communication interface, an updated data tagging policy from at least one external server;
wherein the policy agent engine is configured to configure the data tagging engine with the updated data tagging policy;
wherein the data tagging engine is configured to tag the first subset of the ambient data with at least one data tag according to the updated data tagging policy; and
wherein the communication interface is configured to output at least a second subset of the ambient data including ambient data that has not been tagged by the data tagging engine and, based on the tagging, selectively withholding the tagged first subset from being output in original form.

2. The sensor according to claim 1, wherein:
prior to the ambient data being tagged by the data tagging engine, the ambient data is logically unreadable by any other processing element of the sensor apart from the data identification engine and the data tagging engine, and/or
the sensor is configured to prevent output of the first subset of the ambient data.

3. The sensor according to claim 1, further comprising:
an obfuscation module, wherein the obfuscation module is configured to obfuscate the first subset of the ambient data;
wherein the communication interface is configured to transmit the obfuscated first subset of the ambient data.

4. The sensor according to claim 1, wherein the data identification engine is configured to identify at least the first subset and the second subset of the ambient data.

5. The sensor according to claim 4, wherein the data identification engine is configured to obtain at least one record including a signature of at least one item of specimen ambient data resembling a particular representation of, or particular identifying information related to, personally relevant information, the signature being applicable by the data identification engine to identify the representation of, or the identifying information of personally relevant information in the environment obtained by the sensing element.

6. The sensor according to claim 1, wherein:
the data tagging policy is configured to apply at least one tag to at least one subset of the ambient data according to a data processing policy, and
the data tagging policy defines, for at least one record including a signature of at least one item of ambient data, whether to apply the at least one tag to the at least one item of ambient data.

7. The sensor according to claim 1, further comprising:
a tamper detector communicably coupled to the data tagging engine, the tamper detector being configured to detect an attempt at physical or electronic intrusion to at least one of the sensing element, or the data identification engine, or the data tagging engine;
wherein, upon detection of an intrusion, the data tagging engine is further configured to apply at least a further data tag to the at least the first and second subsets of the ambient data denoting an attempted intrusion, or to obfuscate the data included in at least the first and second subsets of the ambient data.

8. The sensor according to claim 1, wherein:
the sensing element includes one or more of a video camera, a RADAR sensor, a LIDAR sensor, a microphone, or a physical movement sensor, and/or
the data identification engine is configured to obtain a signature of one or more of an image or video containing a person, or car license plates, or house numbers; and/or
the data identification engine is configured to obtain a signature including a specimen RADAR signature of a person; and/or
the data identification engine is configured to obtain a signature including a specimen LIDAR signature of a person; and/or
the data identification engine is configured to obtain a signature including a specimen speech signature of a person; and/or
the data identification engine is configured to obtain a signature including a specimen movement signature of a person.

9. The sensor according to claim 1, wherein the policy agent engine is configured to, prior to the receipt of the updated data tagging policy, store a preset data tagging policy, and to configure the data tagging engine with the preset data tagging policy.

10. The sensor according to claim 1, wherein the data tagging engine includes at least one trained model configured to apply the data tagging policy, wherein the model has been trained using a machine learning technique.

11. A system, comprising:
at least one sensor, including:
a sensing element;
a data identification engine;
a data tagging engine;
a policy agent engine; and
a communication interface, wherein:
the sensing element is configured to obtain ambient data, the ambient data characterizing a condition of an environment proximate to the sensing element;
the data identification engine is configured to obtain the ambient data from the sensing element, and the data identification engine is configured to identify at least a first subset of the ambient data including a representation of, or identifying information related to, personally relevant information obtained by the sensing element;

the policy agent engine is configured to receive, via the communication interface, an updated data tagging policy from at least one external server;

the policy agent engine is configured to configure the data tagging engine with the updated data tagging policy;

the data tagging engine is configured to tag the first subset of the ambient data with at least one data tag according to the updated data tagging policy; and the communication interface is configured to output at least a second subset of the ambient data including ambient data that has not been tagged by the data tagging engine and, based on the tagging, selectively withhold the tagged first subset from being output in original form;

a first data processing node; and a data communications network;

wherein the sensor is configured to transmit at least the second subset of ambient data to the first processing node via the data communications network, and wherein the second subset of ambient data does not include a representation of, or identifying information related to personally relevant information in the environment obtained by the sensing element of the sensor.

12. The system according to claim 11, further comprising:
a second data processing node;
wherein the sensor is configured to transmit at least the first subset of the ambient data to the second processing node via the data communications network; and
wherein the second data processing node is configured to receive the first subset of the data transmitted from the sensor including the first subset of the ambient data with at least one data tag.

13. The system according to claim 11, further comprising:
a first data storage node; and
a second data storage node;
wherein the first data storage node is configured to receive and to store the first subset of the data transmitted from the sensor; and
wherein the second data storage node is configured to receive and to store the second subset of the data transmitted from the sensor.

14. A method for generating sensor data comprising a subset of tagged sensor data, comprising the following steps:

sensing, using a sensing element, ambient data, the ambient data characterizing a condition of an environment proximate to the sensing element;

identifying, using a data identification engine, at least a first subset of the ambient data including a representation of, or identifying information related to, personally relevant information obtained by the sensing element;

receiving, by a policy agent engine, via a communication interface, an updated data tagging policy from at least one external server;

the policy agent engine is configured to configure a data tagging engine with the updated data tagging policy;

tagging, using the data tagging engine, the first subset of the ambient data with at least one data tag according to the updated data tagging policy; and outputting, via a communication interface, at least a second subset of the ambient data including ambient data that has not been tagged by the data tagging engine, wherein, based on the tagging, the tagged first subset selectively withheld from being output in original form.

15. A non-transitory computer readable medium on which are stored machine-readable instructions for generating sensor data comprising a subset of tagged sensor data, the instructions, when executed by a computer, causing the computer to perform the following steps:

receiving, by a policy agent engine, via a communication interface, an updated data tagging policy from at least one external server;

the policy agent engine is configured to configure a data tagging engine with the updated data tagging policy;

tagging, using the data tagging engine, the first subset of the ambient data with at least one data tag according to the updated data tagging policy; and outputting, via a communication interface, at least a second subset of the ambient data including ambient data that has not been tagged by the data tagging engine, wherein, based on the tagging, the tagged first subset selectively withheld from being output in original form.

* * * * *